United States Patent [19]
Sawa et al.

[11] Patent Number: 5,444,306
[45] Date of Patent: Aug. 22, 1995

[54] MOBILE RADIO TELEPHONE APPARATUS

[75] Inventors: Buntaro Sawa, Kanagawa; Makoto Hoshino, Tokyo, both of Japan

[73] Assignee: Kabushiki Kaisha Toshiba, Kanagawa, Japan

[21] Appl. No.: 24,297

[22] Filed: Mar. 1, 1993

[30] Foreign Application Priority Data

Mar. 2, 1992 [JP] Japan .................. 4-044819

[51] Int. Cl.⁶ .............................. H02J 9/00
[52] U.S. Cl. .................. 307/9.1; 379/58; 455/343
[58] Field of Search ............. 455/343, 99, 127; 379/58; 307/9.1, 10.1, 66, 38; 364/426

[56] References Cited

U.S. PATENT DOCUMENTS

| | | | |
|---|---|---|---|
| 5,170,491 | 12/1992 | Murata | 455/73 |
| 5,191,500 | 3/1993 | Hatano et al. | 361/64 |
| 5,201,068 | 4/1993 | Kawashima | 455/89 |
| 5,212,836 | 5/1993 | Matsushita | 455/343 |

*Primary Examiner*—Steven L. Stephan
*Assistant Examiner*—Aditya Krishnan
*Attorney, Agent, or Firm*—Finnegan, Henderson, Farabow, Garrett & Dunner

[57] ABSTRACT

The radio telephone apparatus which is mounted on a car is disclosed. An operational state of the apparatus is memorized therein as a power flag. On the basis of the power flag, the apparatus may be recovered to an operational state at a time when an ignition switch of the car is turned off. More specifically, the power flag may be referred every time a position of the ignition switch is changed from OFF position to ON position. At the event, if the flag indicates that the apparatus was in an operative state at a time when the ignition switch of the car is turned off, the power supply to the apparatus is resumed in response to the position change of the ignition switch. Contrarily, if the flag indicates that the apparatus was not in an operative state, the power supply to the apparatus is not initiated even if the position of the ignition switch is changed.

5 Claims, 4 Drawing Sheets

MOBILE RADIO TELEPHONE APPARATUS

BACKGROUND OF THE INVENTION

1. Field of the Invention

The present invention relates to a mobile telephone apparatus used in a car, and more specifically, the present invention relates to a mobile radio telephone apparatus to which a power supply from a car battery may be turned off by either one of a power switch or an ignition switch.

2. Description of the Relevant Art

A mobile radio telephone apparatus is supplied power from a car battery mounted on a car. A position of an ignition switch of the car affects the operability of the mobile radio telephone.

The ignition switch may be switched into four different positions. The four positions are an OFF position, an accessory (ACC) position, an ON position, and a START position. When the ignition switch is in the ACC position or the ON position, the radio telephone apparatus can be turned on by operating a power switch of the apparatus. When the ignition switch is in the OFF position or the START position, the radio telephone apparatus cannot be turned on.

A user of the radio telephone apparatus may turn on the radio telephone apparatus by first switching the ignition switch into the ACC position or the ON position and operating the power switch of the apparatus itself. After that, if the user switches the ignition switch into the OFF position or the START position, the mobile radio telephone apparatus is turned off accordingly. In the event that the ignition switch is switched to the OFF position, according to the conventional radio telephone apparatus, the operational state set by the power switch is lost. This is because the power switch of such a radio telephone apparatus is constituted by an electronic switch which is different from a mechanical switch. Consequently, when the user wishes to turn on the radio telephone apparatus again, the user has to operate both of the ignition switch and the power switch.

Still, the loss of the operational state of the radio telephone apparatus will occur every time the user switches the ignition switch into the START position in order to start the engine of the car. Therefore disadvantageously, the user always has to turn on the radio telephone apparatus again after the user starts the engine.

SUMMARY OF THE INVENTION

Accordingly, it is an object of the present invention to provide a mobile radio telephone apparatus which is convenient for a user to operate.

It is a further object of the present invention to provide a radio telephone apparatus wherein an operational state of the apparatus may be restored and reproduced after an ignition switch of a vehicle is switched off.

In accordance with the present invention, the foregoing objects are achieved by providing a radio telephone apparatus mounted on a car supplied power from a car battery, the car including an ignition on switch having an "ON" position and an "OFF" position, the radio telephone apparatus comprising a power switch, first detecting means for detecting an actuation of the power switch, storing means coupled to the first detecting means for storing an operational state of the apparatus in response to a detection of the actuation by the first detecting means, second detecting means for detecting if the ignition switch is in the "ON" position or in the "OFF" position, power supply means for supplying the apparatus with electric power from the car battery, and control means coupled to the storing means and the second detecting means for controlling the power supply means so that the electric power is supplied to the apparatus if the operational state indicates that the apparatus is in an operative state when the second detecting means detects that the ignition switch is switched from the "OFF" position to the "ON" position.

In accordance with another aspect of the present invention, the fore, going objects are achieved by providing a method for operating a radio telephone apparatus mounted on a car supplied power from a car battery, the car including an ignition switch having an "ON" position and "OFF" position, the method comprising the steps of detecting an actuation of a power switch of the apparatus, storing an operational state of the apparatus in response to a detection of the actuation of the power switch, detecting if the ignition switch is in the "ON" position or in the "OFF" position, and supplying the apparatus with electric power from the car battery if the stored operational state indicates that the apparatus is in an operative state, when the ignition switch is detected to be switched from the "OFF" position to the "ON" position.

BRIEF DESCRIPTION OF THE DRAWINGS

A more complete appreciation of the present invention and many of its attendant advantages will be readily obtained by reference to the following detailed description considered in connection with the accompanying drawings, in which.

DETAILED DESCRIPTION OF THE PREFERRED EMBODIMENTS

A preferred embodiment of the present invention will be described in detail with reference to the accompanying drawings.

Figure 1:
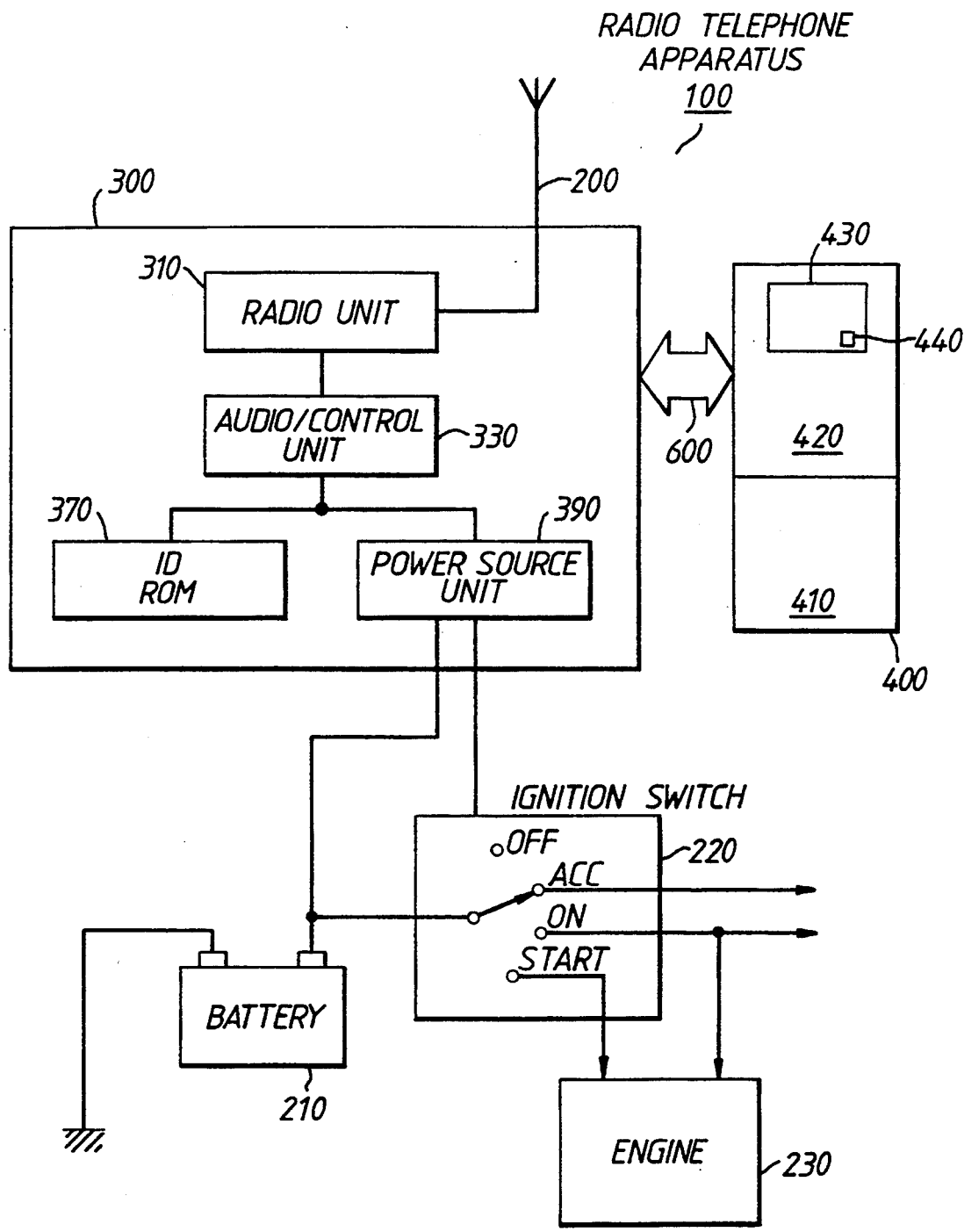
FIG. 1 is a schematic diagram showing the arrangement of a radio telephone apparatus according to an embodiment of the present invention.

FIG. 1 is a block diagram showing a mobile radio telephone apparatus according to one embodiment of the present invention.

The mobile radio telephone apparatus 100 is installed in a car. The radio telephone apparatus 100 includes a radio device 300 and a telephone set 400. The radio device 300 is connected to an antenna 200 provided on the car. The radio device 300 is connected to the telephone set 400 through signal lines 500 and connected to a car. The car battery 220 provides a power source unit 390 of the radio device 300 with electric power.

The ignition switch 220 is provided in order to start or stop an engine 230 of the car. The ignition switch 220 may be switched to one of four different positions. The four positions are an OFF position, an accessory (ACC) position, an ON position, and a START position. When the ignition switch 220 is in the OFF position, the power source unit 390 does not supply power to the main portion of the apparatus 100. When the ignition switch 220 is switched into the ACC position of the ON position, the power is supplied from the power source unit 390 to the apparatus 100 as well as to the other accessory devices of the car. Consequently, those devices are rendered operative. The user may turn the ignition switch 220 into the START position to start the engine 230. During the time ignition switch 220 is positioned in the START position, the power supply to the accessory devices is terminated. Hereinafter, the ACC position or the ON position are collectively called as Ignition ON position while the OFF position or the START position are collectively called as Ignition OFF position.

The radio device 300 is accommodated, for example, in a trunk of the car. The telephone set 400 includes a cradle 410 and a handset 420, which are mounted in the vicinity of the driver seat in the car. A power switch 440 of the apparatus 100 is provided on a keypad unit 430 of the handset 420.

The radio device 300 includes a radio unit 310, an audio/control unit 330, an IDROM 370, and a power source unit 390. The radio unit 310 transmits/receives signals over the radio channels to/from a base station (not shown) through the antenna 200. The audio/control unit 330 controls operations of the apparatus 100. The IDROM 370 stores an identification (ID) number of the radio telephone apparatus 100. The power source unit 390 always receives the power from the car battery 210 and supplies electric power to the respective elements of the radio telephone apparatus 100 in accordance with the position of the ignition switch 220.

Figure 2:
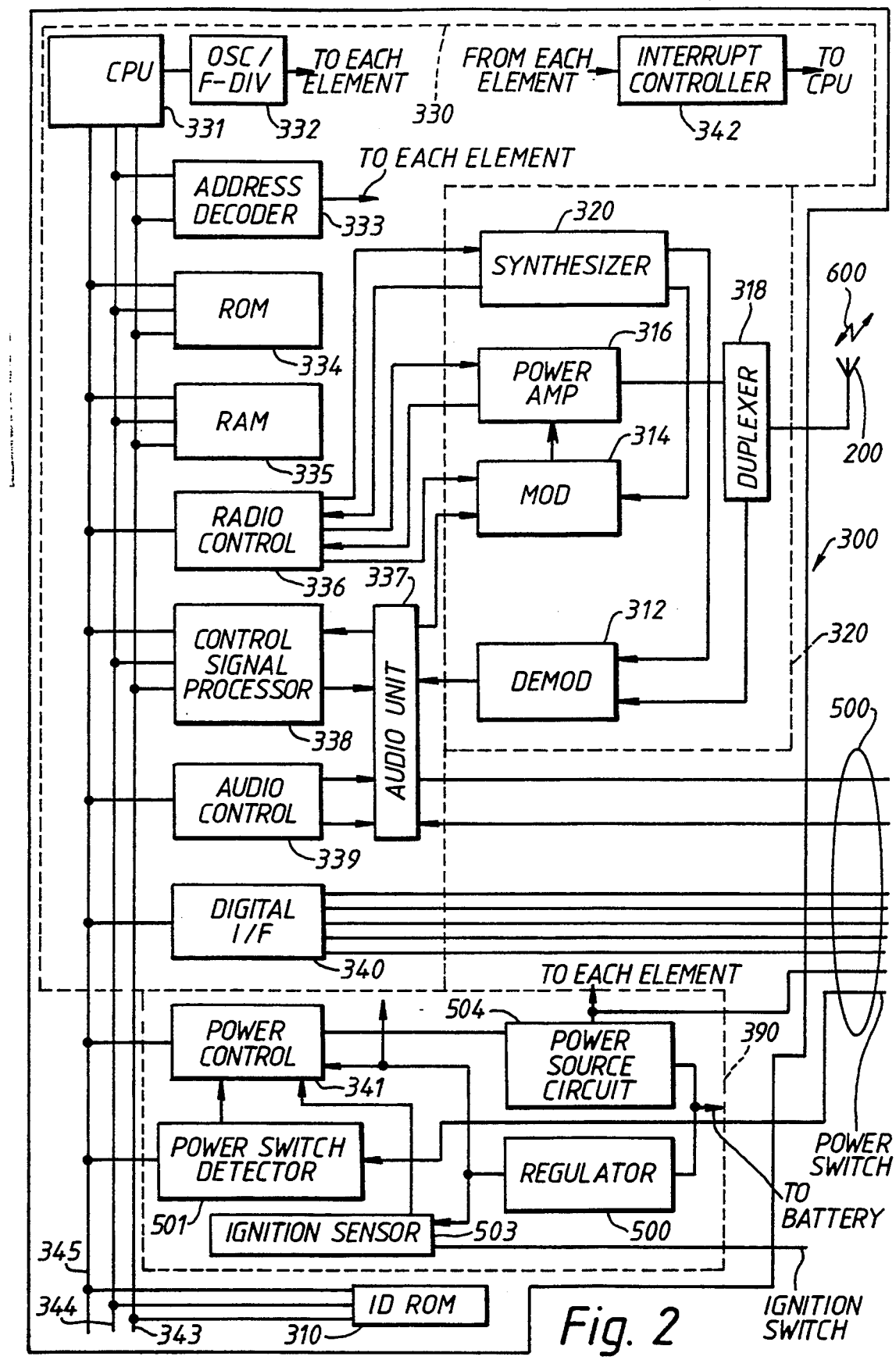
FIG. 2 is a detailed block diagram of a radio device shown in FIG. 1.

FIG. 2 illustrates the detailed arrangement of the radio device 300. The radio unit 310 includes a demodulator 312, a modulator 314, a power amplifier 316, a duplexer 318, and a synthesizer 320.

The demodulator 312 demodulates a signal received from the base station through the antenna 200 and the duplexer 318. The received signals include speech signals and control signals. The modulator 314 modulates the speech signal and the control signals output from an audio unit 337. The power amplifier 316 amplifies transmitted signals output from the modulator 314. The duplexer 318 delivers the signals received through the antenna 200 to the demodulator 312 and delivers transmission signals from the power amplifier 316 to the antenna 200. The synthesizer 320 includes a local oscillator for selection of the radio channels.

The audio/control unit 330 comprises a central processing unit (CPU) 331, an oscillator/frequency divider 332, an address detector 333, a read only memory (ROM) 334, a random access memory (RAM) 335, a radio unit controller 336, an audio unit 337, a control signal processor 338, an audio unit controller 339, a digital interface 340, and an interrupt controller 342. A numeral 343 in the figure denotes, for example, 8-bit data bus; 344, address bus; and 345, control bus.

The CPU 331 controls the entire operation of the apparatus 100. The oscillator/frequency divider 332 delivers a clock to the CPU 331 and divides the clock and delivers the resulting lowered frequencies as timing signals to the respective elements or the radio telephone apparatus 100. The address decode 333 delivers required operating signals to the respective elements in response to a command signal from the CPU 331. The ROM 334 stores various programs required for the operation of the CPU 331. The RAM 335 stores various data such as data required for the operation of the CPU 331.

The radio controller 336 controls the radio unit 310 in accordance with a command from the CPU 331. For example, the radio controller 358 designates a frequency which the synthesizer 320 should provide. The audio unit 337 delivers to control signal processor 330 a control signal demodulated by the demodulator 312; delivers a speech signal to the telephone set 400; and delivers a control signal output from the signal processor 338, the speech signals output from the telephone set 400 to the modulator 314. The control signal processor 338 extracts control data out of the received signals and delivers to the audio unit 337 control data to be transmitted to the base station. The audio unit controller 339 controls switching operations of the audio unit 337.

The digital interface 340 interface between the radio device 300 and the telephone set 400 connected through the signal cable 500 to the radio unit 300. The interrupt controller 342 receives interrupt instructions from respective elements concerned and interrupts the operations of the CPU 331.

The power source unit 390 includes a regulator 502, a power source circuit 504, a power controller 341, a power switch detector 503, and a switch circuit 503.

Figure 3:
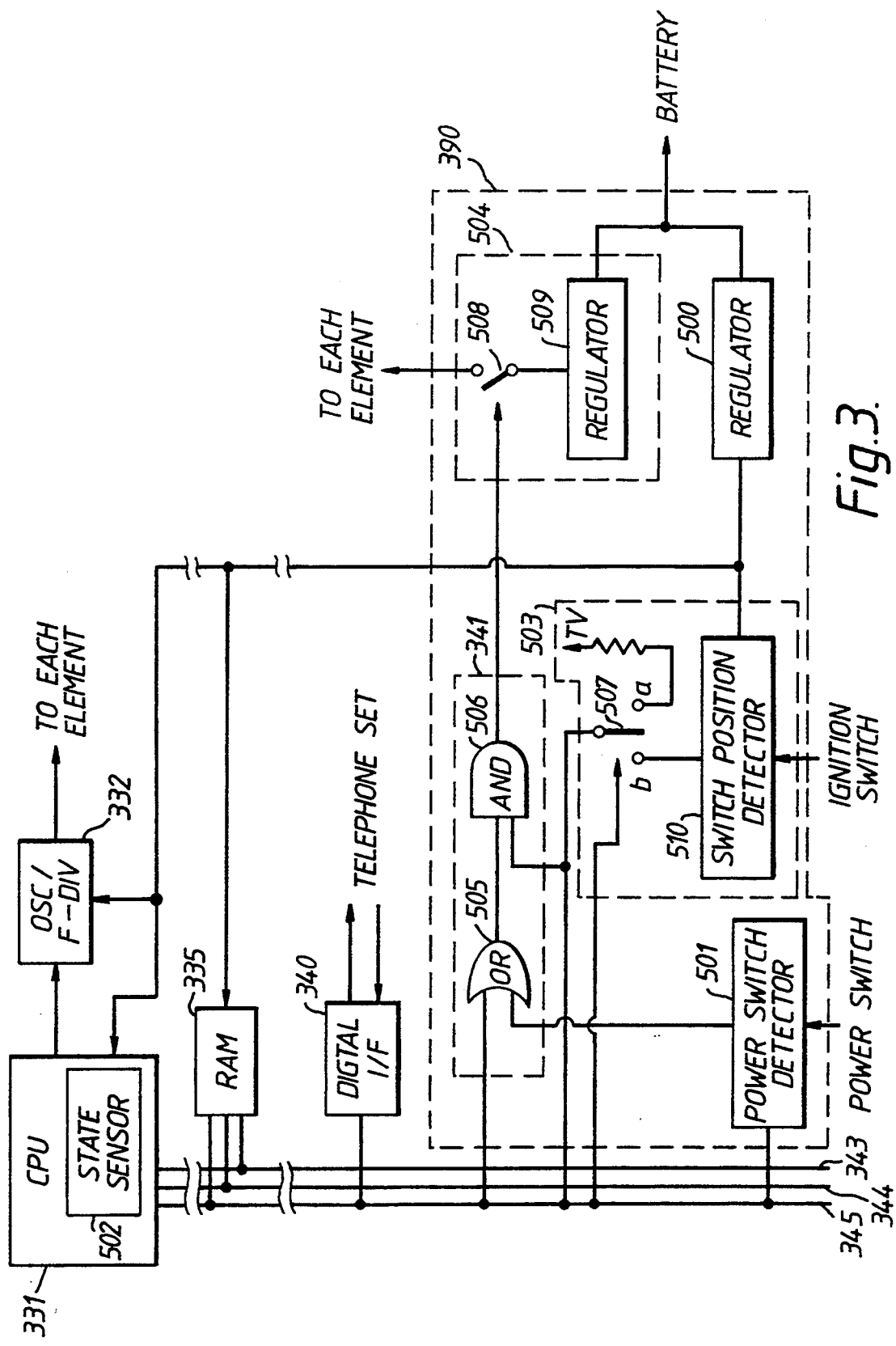
FIG. 3 is a detailed block diagram of a power source unit 390 shown in FIG. 2.

FIG. 3 is a block diagram of the power source unit 390. The arrangements of the power source unit 390 will be described in reference with FIG. 3.

The power source circuit 504 includes a regulator 509 and a switch 508. The power controller 341 includes an AND gate 506 and an OR gate 505.

When the power switch 440 which is an electronic switch is actuated, the power switch detector 501 detects the actuation and outputs on-state signals to the OR gate 505 and CPU 331 through the control bus 345. An ON-duration of the on-state signals correspond to a duration while the power switch 440 is depressed. When CPU 331 detects that the ignition switch 220 is in the Ignition on position, CPU 331 checks whether the ON duration of switch 440 exceeds a predetermined time period, for example 2 seconds. RAM 335 stores a power flag information under the control of CPU 331. The flag of "1" means that the apparatus is in an operational state and the flag of "0" means that the apparatus is in a non-operational state. If the ON duration exceeds the predetermined time period, CPU 331 changes a content of the power flag stored in RAM 335 from "0" to "1" OR "1" to "0" by referring to the power flag. Also, if the flag referred to upon the actuation of switch 440 is "0", CPU 331 outputs an on-state signal to the other input of the OR gate 505 through the control bus 345. Contrarily, if the flag referred to upon the actuation of switch 440 is "1", CPU 331 outputs an off-state signal to the other input of the OR gate 505 through the control bus 345. Accordingly, in response to one actuation of the power switch 440, the OR gate 505 outputs the on-state signal when the apparatus is in a non-operational state and the OR gate 505 outputs the off-state signal when the apparatus is in a non-operational state the OR gate 505 outputs the off-state signal when the apparatus is in an operational state.

The switch circuit 503 includes a switch 507 and an ignition switch position detector 510. In the switch circuit 503, when a special mode is set, the switch 507 connects one input of the AND gate 506 to the regulated voltage: 5 V. When the apparatus operates in a normal mode, the switch 507 connects one input of the AND gate 506 to the output of the switch position detector 510. If the ignition switch 220 is in Ignition On position, the switch position detector 510 outputs an on-state signal. Therefore, AND gate 506 outputs the on-state or off-state signal in response to alternate actuation of the power switch 440 while the ignition switch 220 is in Ignition On position when the apparatus operates in the normal mode.

The regulator 509 is connected to the battery 210. The voltage of the power supplied from the battery 210 is regulated by the regulator 509 at 5 volts. The voltage is applied to the respective elements of the radio telephone apparatus 100 when the switch 508 is closed. In other words, the sections of the apparatus which are other than CPU 331, the oscillator/frequency divider 332, RAM 335, and power source unit 390 may be supplied power only when the switch 508 is closed. It is sure that the radio unit 310 is not powered when the switch 508 is opened. The switch 508 is closed while the on-state signal is applied from AND gate 506. The switch 508 is opened while the off-state signal is applied from AND gate 506.

The regulator 502 regulates 13.2 V applied from the car battery 210 to 5 V and supplies the regulated voltage to the switch position detector 510, a terminal b of the switch 507, RAM 335, CPU 331, and the oscillator/frequency divider 332. Those sections of the apparatus are always supplied power from the car battery while the apparatus is connected to the car battery 210. Thereby, it is possible for CPU 331 to monitor signals from the switch position detector 510 and the power switch detector 501 and control the power control circuit 341 when the apparatus is in a non-operative state.

Figure 4:
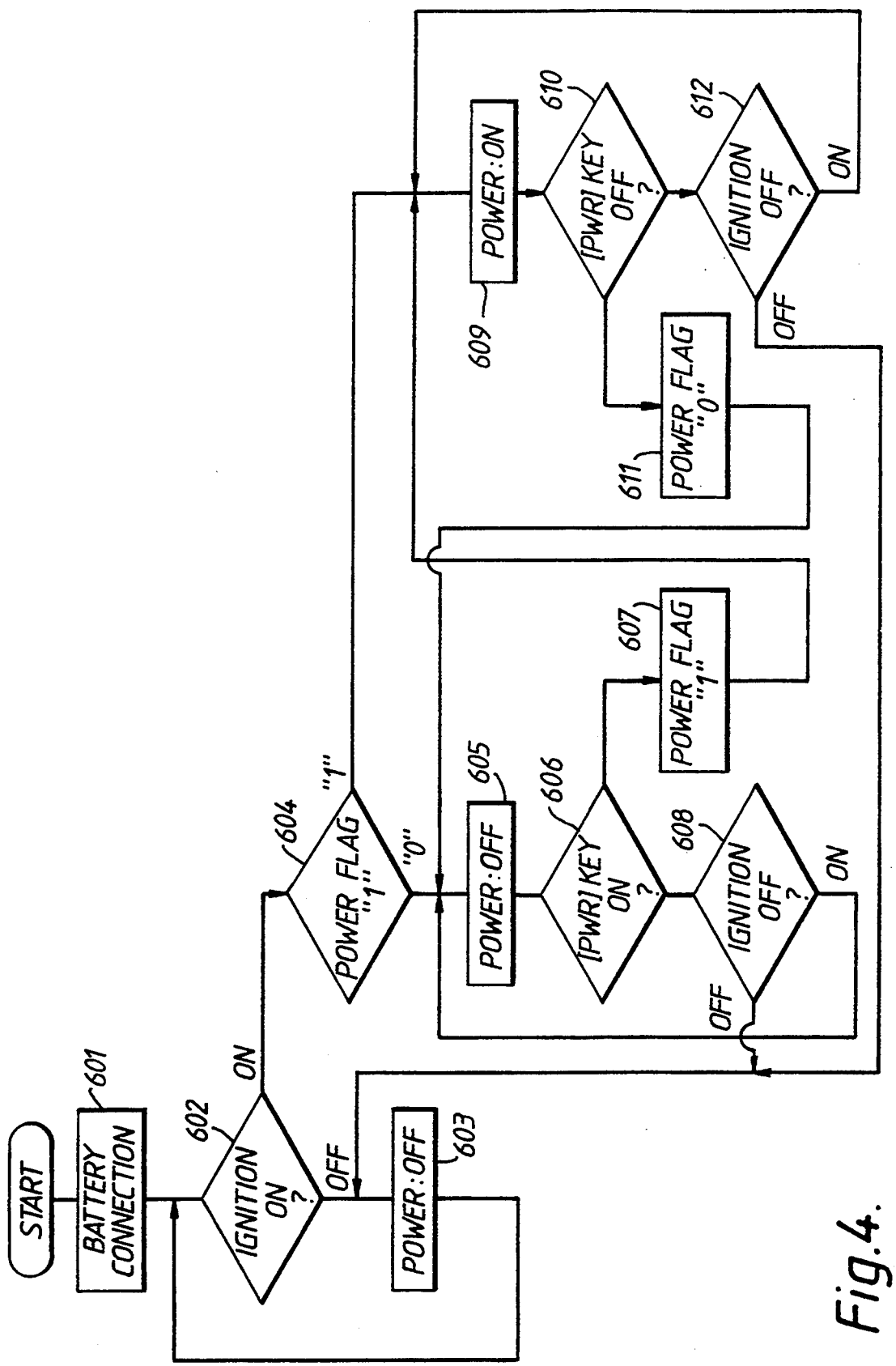
FIG. 4 is a flowchart for explaining an operation of a mobile radio telephone apparatus shown in FIG. 1.

FIG. 4 is a flowchart for explaining the operation of a mobile radio telephone apparatus in the normal mode in accordance with an embodiment of the present invention.

When the radio telephone apparatus is installed in the car, the radio telephone apparatus is connected to the battery 210 and the ignition switch 220. Upon the connection to the car battery 210, the switch position detector 510, the terminal b of the switch 507, RAM 335, CPU 331, and the oscillator/frequently divider 332 are supplied power from the battery 210 (step 601). It should be noted that the switch 507 connects the output of the switch position detector 510 to the control bus 345 in the normal mode as mentioned above.

Then, the CPU 331 detects through the control bus 345 whether the ignition position detector 510 outputs the on-state signal, namely, whether the ignition switch 220 is in Ignition On position (step 602).

If the ignition switch 220 is in Ignition Off, the ignition detector 503 outputs an off-state signal so that AND gate 506 outputs an off-state signal. Accordingly, the switch 508 remains opened and the other section of the apparatus is not supplied power from the car batter 210 (step 603).

If the ignition switch 220 is in Ignition On position, the ignition position detector 510 outputs an on-state signal to AND gate 506 and CPU 331 through the control bus 345. In response to a change of a signal from the switch position detector 510 from off state to on state, CPU 331 checks whether the power flag which is stored in RAM 335 is "1" (step 604). If the power flag is "0", CPU 331 outputs an off-state signal to OR gate 505 through the control bus 345 (step 605). In the next two steps 606 and 608, CPU 331 checks whether the power switch 440 is actuated for a predetermined time period or more on the basis of the applied signal from the power switch detector 501 through the control bus 345 and whether the ignition switch 220 is switched to Ignition Off position on the basis of the signal applied from the ignition detector 503 through the control bus 345. These checks are continued until the power switch 440 is actuated for the predetermined time period or until the ignition switch 220 is switched to Ignition Off position. If the Ignition Off position is detected in step 608, the operation returns to step 603. If the actuation of the power switch 440 is detected in step 606, GPU 331 sets the power flag to "1" (step 607) and proceeds to step 609.

When the operation proceeds to step 608 from step 604 or 607, CPU 331 outputs an on-state signal to OR gate 505. At the event with on-state input to the other input to AND gate 506, the switch 508 is made closed, thereby the other sections of the apparatus are supplied power from the battery 220. After that, in the next two steps 610 and 612, CPU 331 checks whether the power switch 440 is actuated for a predetermined time period or more on the basis of the applied signal from the power switch detector 501 through the control bus 345 and whether the ignition switch 220 is switched to Ignition Off position on the basis of the signal applied from the ignition detector 503 through the control bus 345. These checks are continued until the power switch 440 is actuated for the predetermined time period or until the ignition switch 220 is switched to Ignition Off position. If the Ignition Off position is detected in step 612, the operation returns to step 603. If the actuation of the power switch 440 is detected in step 610, CPU 331 sets the power flag to "0" (step 611) and proceeds to step 605.

As a modification of the above mentioned embodiment, the order of the step 605 and the step 608 of FIG. 4 may be reversed. In the same way, the order of the step 610 and the step 612 of FIG. 4 may be reversed. Furthermore, numerous modifications and variations of the present invention are possible in light of the above teachings. It is therefore to be understood that, within the scope of the appended claims, the present invention can be practiced in a manner other than an especially described herein.

What is claimed is:

1. A radio telephone apparatus mounted on a car supplied power from a car battery, the car including an ignition switch having an "ON" position and an "OFF" position, the radio telephone apparatus comprising:

a power switch;

first detecting means for detecting an actuation of the power switch;

storing means coupled to the first detecting means for storing an operational state of the apparatus in response to a detection of the power switch actuation by the first detecting means;

second detecting means for detecting a functional position of the ignition switch;

power supply means for supplying the apparatus with electric power from the car battery; and control means coupled to the storing means and the second detecting means for directing the electric power from the power supply means to selected sections of the apparatus if the operational state in the storing means indicates that the apparatus is in an operative state when the second detecting means detects that the ignition switch is switched from an "OFF" position to an "ON" position, and for not directing the electric power to the selected sections of the apparatus if the operational state in the storing means indicates that the apparatus is in a non-operative state when the second detecting means detects that the ignition switch is switched from the "OFF" position to the "ON" position.

2. A method for operating a radio telephone apparatus mounted on a car supplied power from a car battery, the car including an ignition switch having an "ON" position and "OFF" position, the method comprising the steps of:

detecting an actuation of a power switch of the apparatus;

storing an operational state of the apparatus in response to a detection of the actuation of the power switch;

detecting if the ignition switch is in the "ON" position or in the "OFF" position; and supplying selected sections of the apparatus with electric power from the car battery if the stored operational state indicates that the apparatus is in an operative state when the ignition switch is detected to be switched from the "OFF" position to the "ON" position.

3. A radio telephone apparatus mounted on a car supplied power from a car battery, the car including an ignition switch having an "ON" position and an "OFF" position, the radio telephone apparatus comprising:

(a) switch means for generating a signal in response to a user's actuation of the switch means;

(b) storing means connected to the switch means for storing the signal;

(c) power supply means connected to the car battery for supplying power to selected sections of the radio telephone apparatus in response to the signal; and (d) control means for controlling the power supply means so that the power supply to the radio telephone apparatus is controlled on the basis of the signal stored in the storing means when the ignition switch is actuated.

4. A radio telephone apparatus as claimed in claim 3, further comprising detecting means for detecting the position of the ignition switch and wherein the control means is coupled to the detecting means and receives the detected position of the ignition switch.

5. A method for operating a radio telephone apparatus mounted on a car supplied power from the car battery, the car including an ignition switch having an "ON" position and "OFF" position, the method comprising the steps of:

(a) generating a signal in response to an actuation of a power switch of the apparatus;

(b) storing the signal as a flag indicative of an operational state of the apparatus; and (c) supplying selected sections of the apparatus with electric power from the car battery if the stored flag indicates that the apparatus is in an operative state when a position of the ignition switch is changed from the "OFF" position to the "ON" position.

* * * * *